United States Patent [19]

Donbavand

[11] 4,291,906
[45] Sep. 29, 1981

[54] DEVICE FOR LOCKING AND SEALING STANDARD CONE-SOCKET JOINTS FOR LABORATORY APPARATUS

[76] Inventor: Martin H. Donbavand, Kantstrasse 133, D-1000 Berlin 12, Fed. Rep. of Germany

[21] Appl. No.: 86,357

[22] Filed: Oct. 26, 1979

[51] Int. Cl.³ .......................................... F16L 49/00
[52] U.S. Cl. .................................. 285/332; 285/337; 285/353; 285/388; 285/DIG. 12
[58] Field of Search ............... 285/DIG. 12, 353, 332, 285/388, 387, 337

[56] References Cited

U.S. PATENT DOCUMENTS

| | | | |
|---|---|---|---|
| 459,910 | 9/1891 | Hogan | 285/388 |
| 498,876 | 6/1893 | Bells | 285/353 X |
| 2,388,633 | 11/1945 | De Woody | 285/DIG. 12 X |
| 2,453,669 | 11/1948 | Meneses | 285/332 |
| 2,688,500 | 9/1954 | Scott | 285/DIG. 12 X |
| 3,001,802 | 9/1961 | Rebman et al. | 285/353 X |
| 3,215,456 | 11/1965 | Schmid | 285/DIG. 12 X |
| 4,135,866 | 1/1979 | Winkler | 285/DIG. 12 X |

FOREIGN PATENT DOCUMENTS

| | | | |
|---|---|---|---|
| 309288 | 11/1955 | Switzerland | 285/DIG. 12 |
| 1174948 | 12/1969 | United Kingdom | 285/353 |

*Primary Examiner*—Thomas F. Callaghan
*Attorney, Agent, or Firm*—Larson and Taylor

[57] ABSTRACT

A coupling is provided to hold together a cone and socket joint between items of laboratory glassware. A first annular member is positioned about the cone portion of the joint and has a male threaded end. A second annular member is positioned about the socket portion of the joint and has a female threaded end which may be screwed onto the male threaded end of the first annular member. The first annular member has a seat which engages with an elastomeric sealing ring so that as the first and second annular members are tightened together the elastomeric sealing ring is compressed into the external line of junction corresponding to the outermost circumference of contact between the cone portion and the socket portion of the assembled joint. The second annular member locates indirectly behind the external strengthening lip around the mouth of the socket portion by means of an interjacent ring which has a male frustoconical surface. The second annular member has an inwardly directed flange formed with a female frustoconical surface which cooperates with the male surface of the interjacent ring whereby, in the assembled coupling, the axis of the assembled coupling is aligned with the axis of the cone and socket joint and the interjacent ring is urged radially inwards behind the socket portion of the joint.

6 Claims, 4 Drawing Figures

DEVICE FOR LOCKING AND SEALING STANDARD CONE-SOCKET JOINTS FOR LABORATORY APPARATUS

FIELD OF THE INVENTION

The invention relates to a coupling for locking and sealing standard interchangeable cone and socket joints used for connecting pieces of laboratory glassware.

BACKGROUND OF THE INVENTION

Cone and socket joints have been in use for many years for the assembly of glass or quartz apparatus. They can be used to connect together lengths of tubing or pieces of apparatus and are usually also made of glass or quartz but are sometimes made of other material such as metal or plastics. These cone and socket joints are standardised in many countries. For example in the Federal Republic of Germany the relevant specifications are DIN Nos. 12242, 12248 and 12249. Cone and socket joints are also the subject of international recommendations, for example those of the International Standards Organization No. P383-1964. These provide a union which is characterised by universal interchangeability, ease of assembly and dismantling, stability, cleanliness and resistance to chemicals. They are primarily known by chemists for their use in laboratory glassware such as is commonly employed in organic chemistry research laboratories, but the same system is now used for glass to metal or metal to metal or quartz to quartz joints and the term "laboratory glassware" as used herein is defined to include any joint of this kind.

The standard cone and socket joint comprises a male member consisting of a hollow truncated cone disposed at the end of a tube or tubular limb of a piece of apparatus or component thereof with a prominent annular shoulder formed between the cone and the adjacent tubing. The female member consists of a socket internally dimensioned to accommodate the male member and possessing a circumferentially thickened external strengthening lip around the mouth, the female member extending integrally into another length of tubing or tubular limb of a piece of apparatus or of a component thereof. The outer surface of the cone and the inner surface of the socket, which mate intimately on assembly of the joint, are commonly ground or in some forms polished, and the gradient of the matching tapers on the cone and socket is usually 1:10, less commonly 1:5.

In spite of the advantages of the familiar cone and socket joints, they are not fully satisfactory for all situations encountered in laboratory practice. Where they are to be used in apparatus working under reduced pressure, care must be taken to ensure that they are made effectively air tight. Cone and socket joints are conventionally made air tight by applying vacuum grease to the mating surfaces. Although this procedure provides a satisfactory seal it cannot be used in cases where the unavoidable contact between the materials being worked and the vacuum grease leads to adverse effects. Furthermore, when cone and socket joints are to be used in systems working at above atmospheric pressure, the same care as above must be taken to ensure sufficient sealing and in addition the joint must be prevented from opening spontaneously under the action of the internal pressure. Attempts have been made to meet these requirements by using adhesive substances instead of grease on the mating surfaces, but this does not afford a sufficiently reliable guarantee against inadvertent separation of the joint under pressure. Furthermore a joint treated in this way cannot readily be dismantled when required.

Another way of securing a cone and socket joint is by means of forked clamps which grip behind the annular shoulder of the cone and behind the strengthening lip of the socket and which are engaged by a loaded spring to urge the cone and socket together. However, there is not reliable guarantee that the joint will not open under abnormally high internal pressures. The same is true of the familiar spring wire clips which are also fastened under tension between the annular shoulder of the cone and the strengthening lip of the socket. Other similar devices employing spring action to prevent separation of the joint suffer from the same disadvantages.

In a non-standard form of cone and socket joint which is described in U.S. Pat. No. 3,140,097, the male member possesses an annular groove in which an O-ring of resilient material is seated, the groove being positioned adjacent to the ground conical surface at its greatest diameter. On insertion of the cone into the socket, the O-ring flattens and seals against the smooth (i.e. unground) inner wall of an extension of the socket. The disadvantages of this form of joint are that it is not in accordance with the universal standard form, and also that it can only be used to advantage in systems working at reduced pressure since positive internal pressure promotes separation of the two members.

A coupling has been proposed in U.K. Specification No. 1,174,948 in which a resilient rubber washer is sandwiched between a male threaded collar which locates behind the reinforcing flange of the socket portion of the joint and a female threaded cap which fits over the cone portion of the joint behind the rubber washer. However, with this arrangement the rubber washer will normally be exposed to a torsional deforming pressure or couple which leads to rapid wear and may result in a poor seal. Furthermore, considerable variations commonly occur in the external diameter of the socket immediately behind the strengthening lip, and a collar having a fixed diameter will often not locate properly behind the strengthening lip.

In German Gebrauschmuster No. 7633564 the inventor herein has described a coupling in which a first annular member is positioned about the cone portion of the joint immediately behind the shoulder and has a male threaded end. A second annular member is positioned about the socket portion of the joint, is engaged behind the external strengthening lip around the mouth of the socket portion, and has a female threaded end which may be screwed onto the male threaded end of the first annular member to hold the cone portion and the socket portion of the joint together. The first annular member is formed with a seat which engages with an elastomeric sealing ring which is positioned about the annular shoulder so as to exert an axial load thereon to compress the elastomeric sealing ring into the external line of junction corresponding to the outermost circumference of contact between the cone portion and the socket portion of the assembled joint. While the joint constructions described and claimed in the said Gebrauschmuster provide desirable improvements in joint coupling technology, the invention herein has found it desirable to make the joint self-centering and to provide a more positive location behind the cone and socket joint.

SUMMARY OF THE INVENTION

It is an object of the invention to provide a screw-together coupling for a cone and socket joint in glassware, wherein the coupling is automatically aligned with the axis of the joint as it is tightened.

It is another object of the invention to provide a coupling for a cone and socket joint which is positively located behind the external strengthening lip on the socket. These objects are fulfilled by providing an annular member which slides over the socket portion of the joint and has an inwardly directed flange formed on its inner face with a female frusto conical surface, a radially expansible ring positioned within the interior of said annular member interjacent the female frusto conical surface and the external stengthening lip for transmitting load, in the assembled coupling, from said annular member to the external strengthening lip, said radially expansible ring having a male frustoconical surface complementary to the female surface in said annular member whereby the axis of the assembled coupling is aligned with the axis of the cone and socket joint and the radially expansible ring is urged radially inwards behind the socket portion of the joint.

DESCRIPTION OF THE PREFERRED EMBODIMENTS

When the coupling of the invention has been assembled in position on a cone and socket joint, the first annular member (hereinafter called the pressure element) bears against the annular shoulder of the cone, the pressure being transmitted via the sealing ring. The second annular member (hereinafter referred to as the tightening element) bears against the strengthening lip of the socket so that the sealing ring seated behind the annular shoulder of the cone is compressed against the circular commisure formed between the cone and socket. By this means, effective sealing of the joint is ensured under both negative and positive internal pressure. The separation of the joint under positive pressure conditions within the tubing is prevented because the elements are securely screwed together.

The surfaces which are in contact with the elastomeric sealing ring are, on one side, part of the pressure element and, on the other side, the surfaces of the cone and socket adjacent their line of junction. If the pressure element is held stationary, the surfaces do not move relative to one another when the elements of the coupling are screwed together. The sealing ring is then subject only to load parallel to its axis of cylindrical symmetry and not to a torsional deforming pressure or couple such as occurs when surfaces are moved over one another and which leads to rapid wear and may result in a poor seal. This desirable method of assembly will automatically be adopted when fitting the coupling because of adoption of a male threaded pressure element and a female threaded tightening element. For further reinforcement of this tendency, the pressure element is preferably formed with a narrow knurled or otherwise suitably profiled surface by which it may be gripped, whereas the tightening element is knurled or profiled over its whole external surface so that naturally and intuitively the pressure element is held stationary with one hand and the tightening element is screwed onto the stationary pressure element with the other hand.

Where smooth lengths of straight tubing are to be joined, or tubular limbs are attached to pieces of apparatus of smaller diameter, both the pressure element and the tightening element can be fitted over the tubing from the end remote from the joint and may be conveniently formed as integral unsegmented annulii. However, in most apparatus the pressure element and the tightening element cannot be slid axially over their respective lengths of tubing to the joint, and both the elements have to be brought into position by passage over the cone portion or socket portion of the joint as the case may be. To enable the elements to be fitted over the anular shoulder or the strengthening lip, they may be formed as two halves which are separable in a plane through the axis of the bore.

The radially expansible ring may be formed in resilient material and may consist of several segments or it may be expansible in the same manner as a circlip. It may conveniently be of polygonal, e.g. rectangular cross section.

The effectiveness of the coupling has been verified by the applicant herein in experimental tests. An ungreased cone and socket joint of standard size 14 was exposed to a positive pressure of 10 atmospheres using nitrogen gas. No escape of gas could be observed when the joint was immersed in water. A similar ungreased size 14 joint was fitted to a vacuum line operating in the range of pressure $10^4$ to $10^5$ Torr using as the sealing ring an O-ring of VITON rubber. The joint showed a leak rate of $7.8 \times 10^{-10}$ Torr/liter/sec.$^{-1}$ which is an order of magnitude less than that which was obtained in a comparative test using a vacuum joint disclosed in U.S. Pat. No. 3,140,097.

An embodiment of the invention will now be described by way of example with reference to the accompanying drawings, in which.

Figure 1:
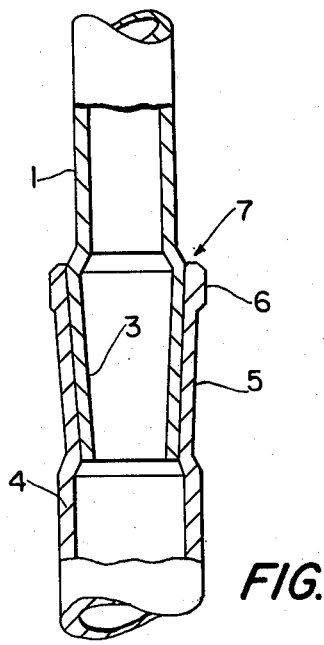
FIG. 1 is a sectional representation of a standard cone and socket joint.

FIG. 1 shows a standard cone and socket joint. A tubular limb 1 extends integrally into a male member consisting of a hollow truncated cone 3, a prominent annular shoulder 2 being formed between the cone 3 and the adjacent tubular limb 1. The cone 3 is ground on its outer surface. The other side of the joint comprises a tubular limb 4 extending integrally into a socket 5 whose internal surface is tapered to match the external surface of the cone 3 and is also ground. At the mouth of the socket is a thickened strengthening lip 6. When the cone 3 and socket 5 are put together, a circular line of junction 7 is formed.

Figure 2:
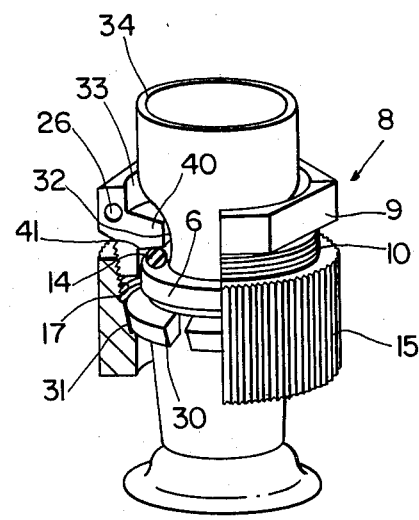
FIG. 2 is an oblique partly cut away view of a cone and socket fitted with a coupling according to the invention.
Figure 3:
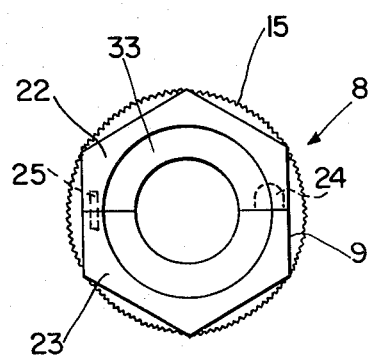
FIGS. 3 and 4 are respectively plan and perspective views of a pressure element consisting of two halves separable in an axial plane.
Figure 4:
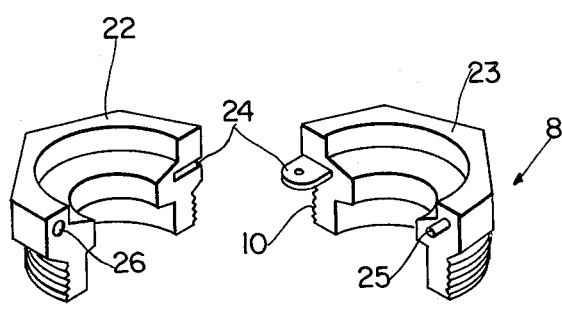

A pressure element 8 has a hexagonal gripping surface 9 for holding in a spanner and a male threaded end portion 10 which is positioned about a relatively short limb 32 connecting a cone to a relatively large diameter glass tube 34. In FIG. 1, glass tube 1 is shown as having constant diameter. However, as shown in FIG. 2, it may have a short limb 32 of small diameter. The inner surface of the pressure element 8 is provided with a generally radial flange or lip 40 whose lower face 41 acts as a seat through which axial pressure can be transmitted to a ring 14 of elastomeric material. The internal diameter of the flange or lip is less than the diameter of the shoulder 2, and in order that the pressure element can be passed over the cone to its required position it is divided into two halves which are separable in a vertical plane passing through the axis of the tightening element. As is apparent from FIG. 4, the pressure element consists of two halves 22, 23 connected by means of a hinge 24 such that the two halves can be brought together about the limb 32, a locating pin 25 on one half engaging a bore 26 in the other half to ensure correct alignment of the two halves.

The cylindroid tightening element 15 is formed with a female thread 17 conforming to the male thread 10 and has a knurled outer surface. At its end remote from the thread 17 it is formed with an inwardly directed flange of greater diameter than the diameter of the strengthening lip on the socket, and the top inner surface of the flange is formed with a female frustoconical surface 31. A radially expandable interjacent ring is positioned behind the strengthening lip 6 of the socket and has male frustoconical external surface 30 which cooperates with the frustoconical surface 31. As the elements of the joint are tightened, the complementary frustoconical surfaces 30, 31 cause a radial inward thrust to be exerted on the interjacent ring which forces it tightly into position behind the strengthening lip 6.

In order that the limb 32 between the cone portion of the joint and the enlarged diameter portion of the glass tube 34 may be made as short as possible (which is often desirable in practice), a diametrically enlarged portion or recess 33 is formed at the end of the pressure element remote from its threaded end.

I claim:

1. In the combination of a cone and socket joint between items of laboratory glassware, which joint comprises a cone portion having a tapered outer wall surface, said cone portion being joined to an adjacent piece of tubing with an annular shoulder formed between said cone portion and said tubing, said cone being fitted within a socket having a tapered inner wall complementary to the taper of the cone and having an external strengthening lip adjacent the mouth of the socket, a line of junction between said cone and socket forming adjacent to said shoulder at the mouth of said socket, with a coupling which coupling comprises: an elastomeric sealing ring for positioning about the annular shoulder; a first annular member for positioning about the cone portion of the joint immediately behind the shoulder and having a male threaded end; a seat in the first annular member engageable with the elastomeric sealing ring to exert an axial load thereon; and a second annular member for positioning about the socket portion of the joint and having a female threaded end which may be screwed onto the male threaded end of the first annular member to hold the cone portion and the socket portion of the joint together and to compress the elastomeric sealing ring into said line of junction between the cone portion and socket portion of the joint to seal said line of junction, said first annular member being constructed and arranged to be held stationary when said second annular member is screwed thereon whereby said sealing ring is subject only to load parallel to its axis of cylindrical symmetry and not to a torsional deforming pressure, the improvement wherein the second annular member has an inwardly directed flange formed with a female frustoconical surface and spaced axially from the female thread, and wherein a radially expansible split ring is positioned within the interior of the second annular member between the female frustoconical surface and the external strengthening lip, said radially expansible split ring having a male frustoconical surface complementary to said female surface of said second annular member, said radially expansible split ring having a radial gap, said gap having a size sufficient to permit the ring to be tightly moved into position behind said external strengthening lip, whereby, when said first and second annular members are screwed together, the axis of the assembled coupling is aligned with the axis of the cone and socket joint and the radially expansible split ring is urged radially inwards behind the socket portion of the joint.

2. The coupling of claim 1, wherein the radially expansible ring is of resilient material and has a radial slit like a circlip.

3. The coupling of claim 1, wherein said first annular member has a diametrically enlarged portion remote from its threaded end, said enlarged portion having a relatively small axial extent whereby said first annular member may be applied to a cone attached by a relatively short intermediate limb to a tube or body of larger diameter.

4. The coupling of claim 1, wherein said first annular member is profiled for gripping in a portion of its outer circumferential surface remote from said male threaded end and occupying only a relatively small axial distance, and said second annular member is profiled for gripping over substantially the whole of its external surface occupying a relatively large axial distance whereby the user is naturally lead to hold said first annular member stationary with one hand and move said second annular member with the other hand.

5. The coupling of claim 1, wherein said first annular member is formed in halves arranged for positioning about the respective cone or socket portion of said joint and separable in a plane passing through the axis of said member to allow said member to be fitted around tubing adjacent to said cone portion of said joint.

6. The coupling of claim 1 wherein the inner diameter of said inwardly directed flange is greater than the outer diameter of said strengthening lip.

* * * * *